US008738579B2

(12) United States Patent
Huras et al.

(10) Patent No.: US 8,738,579 B2
(45) Date of Patent: May 27, 2014

(54) METHOD FOR PERFORMING A WARM SHUTDOWN AND RESTART OF A BUFFER POOL

(75) Inventors: Mathew Albert Huras, Ajax (CA); Keriley Kay Romanufa, Scarborough (CA); Aamer Sachedina, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 10/852,914

(22) Filed: May 24, 2004

(65) Prior Publication Data

US 2004/0267787 A1   Dec. 30, 2004

(30) Foreign Application Priority Data

Jun. 25, 2003   (CA) ..................................... 2433254

(51) Int. Cl.
*G06F 7/00* (2006.01)
*G06F 17/00* (2006.01)
(52) U.S. Cl.
USPC .......................................... 707/648; 707/649
(58) Field of Classification Search
USPC .......................................... 707/200, 648, 649
See application file for complete search history.

(56) References Cited

U.S. PATENT DOCUMENTS

| | | | | |
|---|---|---|---|---|
| 4,422,145 A * | 12/1983 | Sacco et al. | ................... | 711/160 |
| 5,237,661 A * | 8/1993 | Kawamura et al. | ............. | 710/52 |
| 5,333,303 A * | 7/1994 | Mohan | ............................ | 714/20 |
| 5,455,944 A | 10/1995 | Haderle et al. | ................ | 395/600 |
| 5,548,770 A * | 8/1996 | Bridges | ............................. | 707/2 |
| 5,701,516 A * | 12/1997 | Cheng et al. | .................... | 710/22 |
| 5,940,848 A * | 8/1999 | Bains | ................................ | 711/1 |
| 6,173,292 B1 | 1/2001 | Barber et al. | ................ | 707/200 |
| 6,205,450 B1 * | 3/2001 | Kanome | ....................... | 707/203 |
| 6,233,619 B1 | 5/2001 | Narisi et al. | .................. | 709/230 |
| 6,282,589 B1 | 8/2001 | Porterfield et al. | ............. | 710/52 |
| 6,301,630 B1 | 10/2001 | Chen et al. | .................... | 710/129 |
| 6,317,134 B1 | 11/2001 | Hagemark et al. | ............ | 345/512 |
| 6,345,296 B1 | 2/2002 | McCrory et al. | .............. | 709/227 |
| 6,567,928 B1 * | 5/2003 | Lyle et al. | ....................... | 714/15 |
| 7,047,380 B2 * | 5/2006 | Tormasov et al. | ............ | 711/162 |
| 2002/0116588 A1* | 8/2002 | Beckert et al. | ................ | 711/161 |
| 2002/0188691 A1 | 12/2002 | Ignatius et al. | ............... | 709/208 |
| 2004/0181560 A1* | 9/2004 | Romanufa et al. | ............ | 707/202 |

OTHER PUBLICATIONS

"Operating the Software AG Editor," available at: http://elm.state.ak.us/saga/nat3121299cdd/natmf/om/8edit.htm, on Dec. 30, 2002.
"Informix Unleashed," SAMS Publishing, available at: http://docs.rinet.ru:8083/InforSmes/ch11/ch11.htm, on Dec. 30, 2002.

\* cited by examiner

*Primary Examiner* — Mariela Reyes
(74) *Attorney, Agent, or Firm* — Sawyer Law Group, P.C.

(57) ABSTRACT

A system and a method for performing a warm shutdown and restart of a buffer pool. The buffer content, including pages and control structures associated with these pages, is partitioned into blocks, where block is saved to a disk as a sequential file. The size of each block is selected to provide an optimal I/O efficiency during buffer pool shutdown and restart operations. Blocks can be saved simultaneously using a plurality of writer threads. During restart of the buffer pool, the control information is read from the disk and restored to the buffer pool using reader threads. The buffer pool may be made available for reference to pages while the reader threads are enabled to read the saved information by blocks, to facilitate a more rapid restoration of information in the buffer pool.

18 Claims, 3 Drawing Sheets

US 8,738,579 B2

METHOD FOR PERFORMING A WARM SHUTDOWN AND RESTART OF A BUFFER POOL

PRIORITY CLAIM

The present application claims the priority of Canadian patent application, Serial No. 2,433,254, titled "System and Method for Warm Shutdown and Restart of a Buffer Pool" which was filed on Jun. 25, 2003, which is incorporated herein by reference.

FIELD OF THE INVENTION

The present system is related to the field of database management systems and more particularly to buffer pool shutdown and restart.

BACKGROUND OF THE INVENTION

Many software systems such as information retrieval systems, database engines, and database management systems (DBMSs) use a buffer pool or buffer cache to store recently accessed data. In these systems, buffer pool sizes are relatively large. Capacities in the 100 GB range are common. A buffer pool in such software systems comprises a number of individual fixed sized pages. The DBMS manages data in the database and the buffer pool by these individual fixed size pages.

As the database is referenced during processing of user requests, pages of the database are read from one or more disks storing the database and are cached to the buffer pool once the data in a page becomes accessed. The buffer pool may contain "clean" pages which have not been modified to memory after having been read from disk and may contain "dirty" pages which include modifications to the database in the buffer pool. When the buffer pool is shutdown, dirty pages (that is, data contained in the dirty pages) must be written to disk or other persistent storage in order to maintain the data modifications contained in those pages. Typically, existing software is faced with two problems associated with shutdown and startup of buffer pools. The first problem arises because a buffer pool is managed at the granularity of a page: the pool consists of pages in memory that are most likely not from contiguous disk locations. As a result, when a large percentage of pages are dirty, saving such pages is inefficient because saving dirty pages to disk may require writing to random or non-sequential offsets, making more frequent disk subsystem I/O effort, and the pages in the buffer pool may become saved in a non-contiguous fashion to the persistent disk storage.

The second problem results from a loss of information when the buffer pool is shutdown. A populated buffer pool contains implicit information by virtue of the pages that are cached to the buffer pool at any point in time. The set of pages that are cached in the buffer pool at some point in time represents the set of pages that the DBMS considers most likely to be reused and thus most worthy of caching at that point in time. When a buffer pool is shutdown, this cached information may be lost which is highly undesirable.

When restarted, a buffer pool management sub-system takes time to relearn which pages are the most worthy of caching to the buffer pool. This relearning effort may take a significant amount of time. As a result, the first accesses to the database will be penalized as it is necessary to read the referenced pages from disk rather than from the buffer pool. Thus, the application that needs the data will have to wait longer in comparison to the situation in which the buffer pool had already cached the desired page from persistent storage.

A further problem common to buffer pool starts and restarts is buffer pool allocation. Typically, a buffer pool is not made available for storing pages to or retrieving pages from the buffer pool until the portion of the buffer pool configured for storing pages is completely allocated in memory. This allocation may unnecessarily delay the start (or restart) of the information retrieval system using the buffer pool.

A solution to some or all of these shortcomings is therefore desired. What is therefore needed is a system, a computer program product, and an associated method for maintaining cached information during shutdown and restart. The need for such a system has heretofore remained unsatisfied.

SUMMARY OF THE INVENTION

The present invention satisfies this need, and presents a system, a computer program product, and an associated method (collectively referenced herein as "the system" or "the present system") for performing a warm buffer pool shutdown and restart.

The present system comprises an information retrieval system coupled to a memory and coupled to a buffer pool. The buffer pool maintains a plurality of pages of recently accessed information. The present system restarts the buffer pool after shutting down the information retrieval system. Before shutting down the information retrieval system, the present system stores one or more of the pages to the memory. In addition, the present system stores control information associated with the buffer pool to the memory. The control information is used by the information retrieval system to restore one or more pages to the buffer pool upon restart of the information retrieval system.

The memory comprises persistent memory or a hard drive. The buffer pool comprises volatile memory. Utilizing the present system, the information retrieval system restores the buffer pool with one or more pages upon a restart of the information retrieval system.

The present system stores the one or more pages as sequentially stored blocks of pages. Each block comprises a page and a group of sequential pages. The present system selects the size of each of the blocks to optimize input/output operations. Further, the present system may store the blocks in parallel.

The present system restores the control information and pages by reading blocks of pages; each block comprises a page and group of sequential pages. The size of each of the blocks is selected to optimize input/output operations. Further, the present system may read the blocks in parallel.

Once the control information has been restored by the present system, the pages of the buffer pool can be referenced during the process of restoring the pages. The present system permits reference to these pages by, for example, latching a particular page to delay a reading of the particular page from the buffer pool until the particular page is restored from the persistent memory. Further, the present system permits reference to pages of the buffer pool while restoring the pages by, for example, allocating portions of the buffer pool for storing the pages. In addition, the present system may prioritize the restoring of a particular page in response to a reference to the particular page.

To restore blocks, the present system generates read requests instructing the reading of the blocks such that reading the blocks is performed in accordance with the read requests. The present system read requests may comprise ordering the requests in response to a predicted relative need for each of the blocks.

In accordance with another embodiment according to the present invention, the memory may be a hard disk drive.

The information retrieval system utilizes a restart system that comprises one or more writers. In response to a buffer pool shutdown, the writers are adapted to store one or more pages to the memory. In addition, the writers store control information associated with buffer pool to the memory for restoring the pages to the buffer pool upon a restart.

The restart system comprises one or more readers adapted to restore control information and pages. Restoring the control information and pages enables the buffer pool for re-access in response to a buffer pool restart.

The present system utilizes a computer program product having a computer readable medium tangibly embodying computer executable code for directing the information retrieval system to restart the buffer pool after shutting down the information retrieval system. The computer program product comprises code for storing one or more pages to the memory before shutting down the information retrieval system. The computer program product further comprises code for storing control information associated with said buffer pool to the memory. The control information is used by the information retrieval system to restore the one or more pages to the buffer pool upon a restart of the information retrieval system.

The computer program product comprises code for, on a restart, restoring the control information and pages to enable the buffer pool for re-access.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following detailed description of the embodiments of the present invention does not limit the implementation of the invention to any particular computer programming language. The present invention may be implemented in any computer programming language provided that the O/S (Operating System) provides the facilities that may support the requirements of the present invention. A preferred embodiment is implemented in the C or C++ computer programming language (or other computer programming languages in conjunction with C/C++). Any limitations presented would be a result of a particular type of operating system, data processing system, or computer programming language, and thus would not be a limitation of the present invention.

Figure 1:
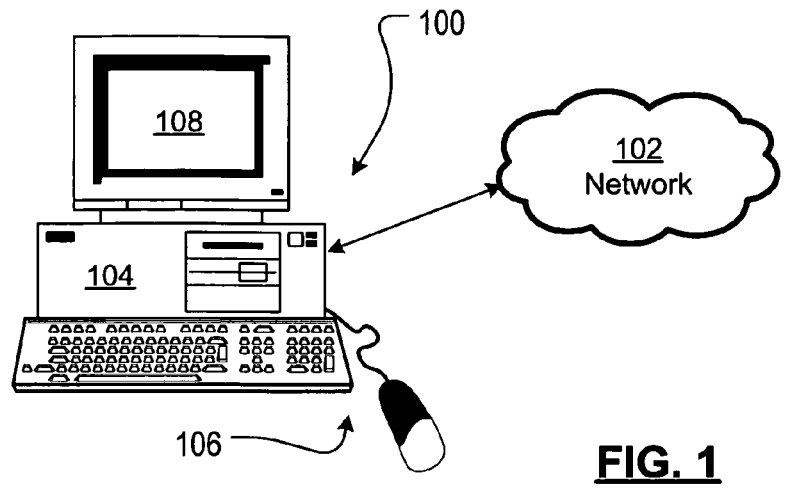
FIG. 1 is a schematic illustration of an exemplary computer system in which a warm shutdown and restart function of the present invention can be used.

An embodiment of the invention, a computer system 100, is illustrated in FIG. 1. The computer system 100, which is illustrated for exemplary purposes as a computing device, is adapted to communicate with other computing devices (not shown) using a network 102. As will be appreciated by those of ordinary skill in the art, network 102 may be embodied using conventional networking technologies and may include one or more of the following: local networks, wide area networks, intranets, the Internet, and the like.

Through the description herein, an embodiment of the invention is illustrated with aspects of the invention embodied solely on the computer system 100. As will be appreciated by those of ordinary skill in the art, aspects of the invention may be distributed among one or more networked computing devices that interact with the computer system 100 using one or more networks such as, for example, network 102. However, for ease of understanding, aspects of the invention have been embodied in a single computing device, the computer system 100.

The computer system 100 typically comprises a processing system 104 that is enabled to communicate with the network 102 in addition to various input devices 106 and output devices 108. The input devices 106 (a keyboard and a mouse are shown) may comprise a scanner, an imaging system (e.g., a camera, etc.), or the like. Similarly, the output devices 108 (only a display is illustrated) may comprise printers and the like. The input devices 06 and the output devices 108 are collectively referenced herein as I/O devices 106, 108. Additionally, combination input/output (I/O) devices may be in communication with the processing system 104. Examples of conventional I/O devices (not shown in FIG. 1) include removable recordable media (e.g., floppy disk drives, tape drives, CD-ROM drives, DVD-RW drives, etc.), touch screen displays, and the like.

Figure 2:
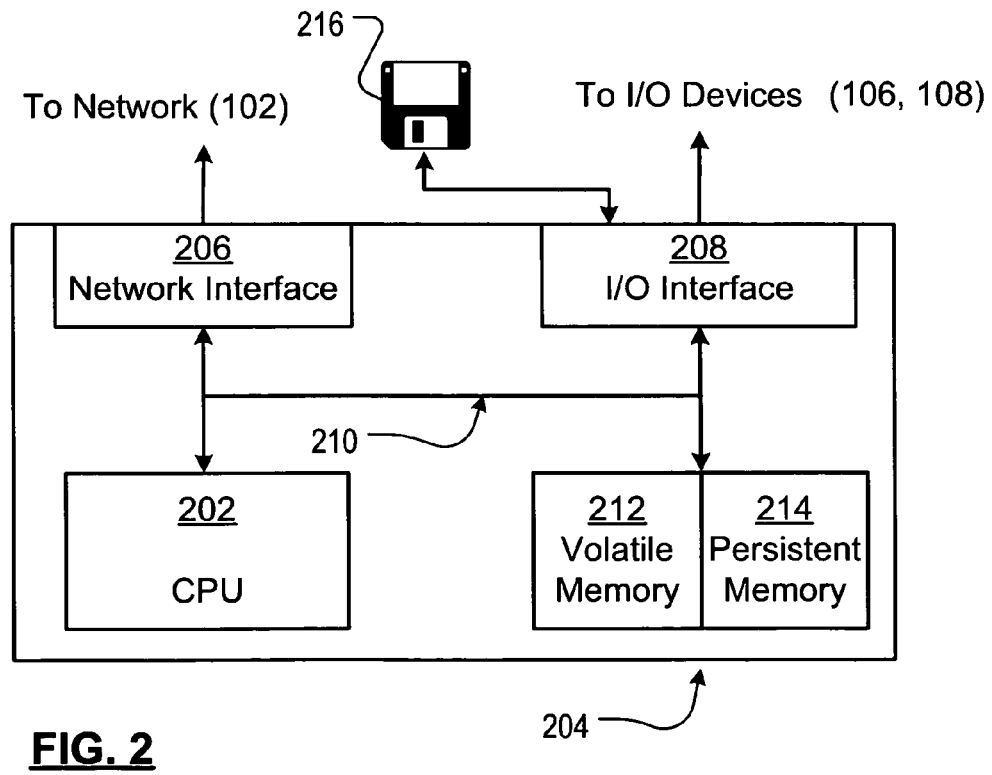
FIG. 2 is a schematic illustration of a processing system of the computer system of FIG. 1 on which the warm shutdown and restart function of the present invention can be installed.

Exemplary processing system 104 is illustrated in greater detail in FIG. 2. As illustrated, the processing system 104 comprises: a central processing unit (CPU) 202, a memory 204, a network interface (I/F) 206, and an input-output interface (I/O I/F) 208. Communication between various components of the processing system 104 may be facilitated via a suitable communications bus 210 as required.

CPU 202 is a processing unit, such as an Intel Pentium™, IBM PowerPC™, Sun Microsystems UltraSparc™ processor, or the like, suitable for the operations described herein. As will be appreciated by those of ordinary skill in the art, other embodiments of the processing system 104 may use alternative CPUs and may include embodiments in which two or more CPUs are employed (not shown). CPU 202 may comprise various support circuits to enable communication between itself and the other components of processing system 104.

Memory 204 comprises both a volatile memory 212 and a persistent memory 214 for the storage of: operational instructions for execution by CPU 202, data registers, application storage, thread storage, and the like. Memory 204 comprises a combination of random access memory (RAM), read only memory (ROM) and persistent memory such as that provided by a hard disk drive, flash memory or the like.

The network I/F 206 enables communication between other computing devices (not shown) and other network computing devices via network 102. The network I/F 206 may be embodied in one or more conventional communication devices. Examples of a conventional communication device include: an Ethernet card, a token ring card, a modem, or the like. Network I/F 206 may also enable the retrieval or transmission of instructions for execution by CPU 202, from or to a remote storage media or device via network 102.

The I/O I/F 208 enables communication between the processing system 104 and the various I/O devices 106 and 108. The I/O I/F 208 comprises, for example, a video card for interfacing with an external display such as the output device 108. Additionally, the I/O I/F 208 enables communication between the processing system 104 and a removable media 216. The removable media 216 comprises a conventional diskette or other removable memory devices such as Zip™ drives, flash cards, CD-ROMs, static memory devices, and the like. The removable media 216 may be used to provide instructions for execution by CPU 202 or as a removable data storage device.

Figure 3:
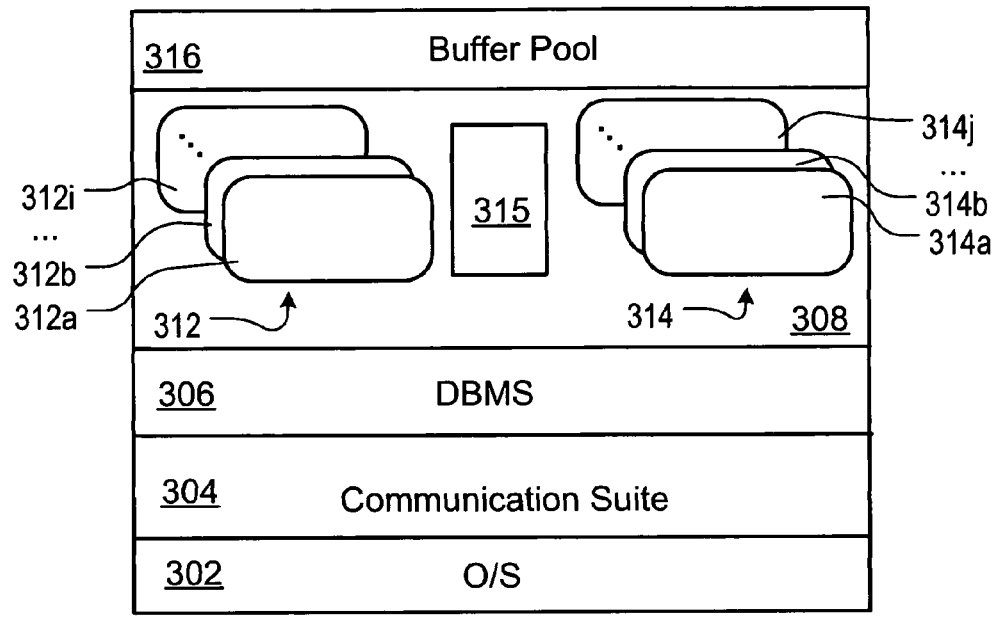
FIG. 3 is a high level hierarchy of a portion of the memory illustrated in FIG. 2 comprising the warm shutdown and restart function of the present invention.

Computer instructions/applications stored in memory 204 and executed by CPU 202 (thus adapting the operation of the computer system 100 to the present invention as described herein) are illustrated in functional block form in FIG. 3. As will be appreciated by those of ordinary skill in the art, the discrimination between aspects of the applications illustrated as functional blocks in FIG. 3 is somewhat arbitrary in that the various operations attributed to a particular application as described herein may, in an alternative embodiment, be subsumed by another application.

As illustrated for exemplary purposes only, memory 204 stores instructions and data for enabling the operation of the system for buffer pool warm shutdown and restart that comprise: an operating system (O/S) 302, a communication suite 304, a database management system (DBMS) 306 adapted to include a warm shutdown and restart function 308 and a buffer pool 316. The warm shutdown and restart function 308 comprises in the exemplary embodiment, one or more writer threads 312 (writer threads 312a, 312b, 312i are shown), one or more reader threads 314 (reader threads 314a, 314b, 314j are shown), and a restore control 315. It will be apparent to persons skilled in the art that the buffer pool 316 is typically stored in the volatile memory 212 when in operation while the remaining instructions and data may be stored to persistent memory 214 during operation.

The applications such as O/S 302, the communication suite 304, DBMS 306, the warm shutdown and restart function 308, the writer threads 312 and the reader threads 314 may be stored to the volatile memory 212 or the persistent memory 214. The buffer pool 316 is stored in the volatile memory 212.

O/S 302 is an operating system suitable for operation with a selected CPU 202 and the operations described herein. Multi-tasking, multi-threaded O/Ss such as, for example, IBM AIX™, Microsoft Windows, Linux or the like, are expected to be preferred in many embodiments. The buffer pool 316 is specifically reserved as a region of memory 204 for storing information. Though shown as a single contiguous region, persons skilled in the art will understand that the buffer pool 316 may comprise two or more regions of memory 204. Typically, each region is a multiple of the page size used by DBMS 306. The communication suite 304 provides, through interaction with O/S 302 and the network I/F 206 (FIG. 2), suitable communication protocols to enable communication with other networked computing devices via network 102 (FIG. 1). The communication suite 304 may include one or more of such protocols such as TCP/IP, Ethernet, token ring and the like. Communications suite 304 comprises asynchronous transport communication capabilities for communicating with other computing devices.

DBMS 306 is a software application executable in the environment of O/S 302 to provide information stored in a database (not shown) to client applications (not shown) on request. The database is typically stored in the persistent memory 214 or other persistent storage coupled to the computer system 100. Client applications also can be run in the environment of O/S 302 or can be run on other computer systems adapted to communicate with the computer system 100 using the network 102.

DBMS 306, to minimize disk access and/or network traffic flow, stores recently accessed data from the database to the buffer pool 316 in the volatile memory 212. The buffer pool 316 is often set up as part of the work space of DBMS 306.

DBMS 306 may require being shutdown and restarted. In accordance with in the prior art, DBMSs save only dirty pages stored in the buffer pool 316 to the persistent storage storing the database requiring a plurality of shutdown or non-sequential writes. In accordance with the invention, DBMS 306 as adapted for warm shutdown, saves pages (for example, but not limited to, dirty pages) of the buffer pool 316 and control information associated with the pages to sequential space on the persistent memory 214 using the writer threads 312. The persistent memory 214 for such purposes typically comprises a hard disk drive but may include flash memory or another persistent storage device that provides sufficient I/O characteristics for fast shutdowns and restores. For example, tape media or writable CD-ROMs, DVDs or the like generally have slow write response times. Persistent storage devices with I/O characteristics similar to hard disk drives are desirable.

Information from the buffer pool 316 may be written in a parallel way such that the writer threads 312 can write different portions of the buffer pool 316 at the same time to contiguous space (for example using an O/S primitive such as vectored write). For I/O efficiency, large block writes such as several megabytes per write may be desirable as opposed to a single page (few thousand bytes) per write. In such a case of large block writes, both clean and dirty pages are typically written out. To restore data in the buffer pool 316, DBMS 306 employs the reader threads 314 for restoring saved data from the persistent memory 214 to the buffer pool 316 as described further herein. While restoring saved data from the persistent memory 214, the restore control 315 permits reference to the saved data.

Figure 4:
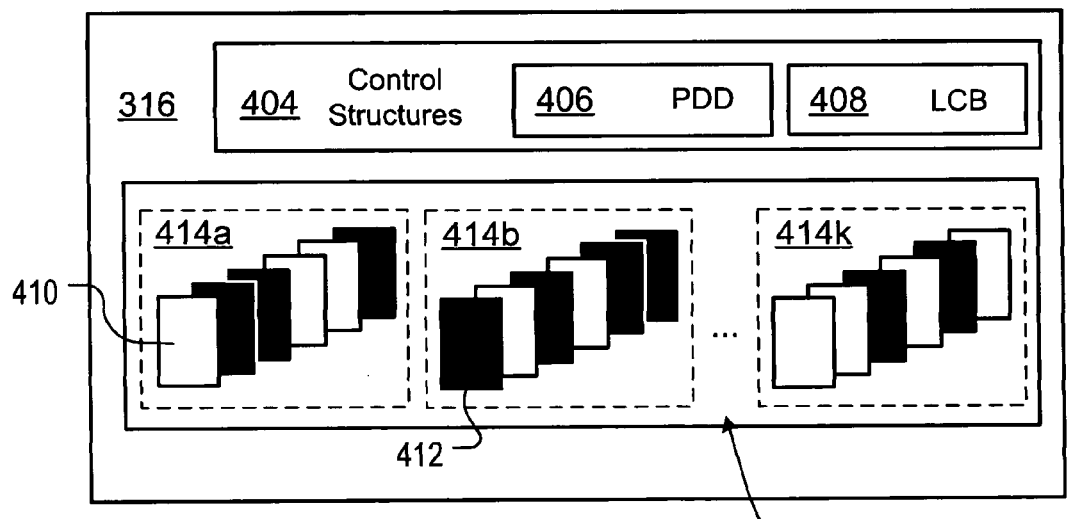
FIG. 4 is a schematic diagram illustrating a buffer pool of FIG. 3 that may be used by the warm shutdown and restart function of FIG. 3.

FIG. 4 illustrates schematically an exemplary structure of the buffer pool 316. The buffer pool 316 is used to store recently accessed data, which is stored as memory pages 402 and control structures 404. The control structures 404 store information for describing a state of each individual page of the memory pages 402. Typically, control structures comprise but are not limited to a page descriptor directory (PDD) 406 and a log control block (LCB) 408.

Each individual page of the memory pages 402 may be clean (schematically illustrated as a white rectangle 410) or dirty comprising data in the buffer pool 316 that has not been stored to the persistent data store for the database (schematically illustrated as a black rectangle 412). The buffer pool 316 comprises one or more contiguous regions of the volatile memory 212 where the clean and dirty pages are not separated from each other. To differentiate clean and dirty pages, information is maintained in an assigned page descriptor (PD) stored in PDD 406. The page descriptor also comprises a page latch construct that is used to protect access to the page and a log sequence number (LSN) for maintaining information indicating whether the page is modified. In LCB 408, DBMS 306 maintains information such as the minimum log sequence number representing the oldest modification to one of the pages in the buffer pool 316. The minimum log sequence number indicates how far back the DBMS 306 must maintain log records in the primary (as opposed to the archived) log space for crash recovery purposes.

The memory pages 402 of the buffer pool 316 may be logically divided into a number of blocks (three blocks 414a, 414b and 414k are shown for illustrative purposes only). The size of each block may be selected to optimize input/output (I/O) efficiency (i.e. disk read and disk write access efficiency) during shutdown and restart operations of the buffer pool 316. Thus a block may be a single page or a group of contiguous pages. DBMS 306 uses writer threads 312a, 312b and 312i and may also make the process of saving information from the buffer pool 316 more effective using parallel writing of blocks 414a, 414b and 414k. Upon initiation of warm shutdown, each writer thread 312a, 312b and 312i saves a respective assigned block 414a, 414b and 414k at the same time. The same multi-thread principles may also be applied to restoring operations when the saved information is read in and restored to the buffer pool 316 by a number of the reader threads 314 that may read and restore information to the buffer pool simultaneously. Though described in terms of writing out blocks 414a, 414b, and 414k, it is understood that each of the writer threads 312 may be directed to write only dirty pages rather than writing the entire buffer pool.

The warm shutdown and restart of the buffer pool 316 is performed in a warm shutdown stage and a restart stage. The warm shutdown stage is described in greater detail below with reference to FIG. 5, and the restart stage is described in greater detail below with reference to FIG. 6.

Figure 5:
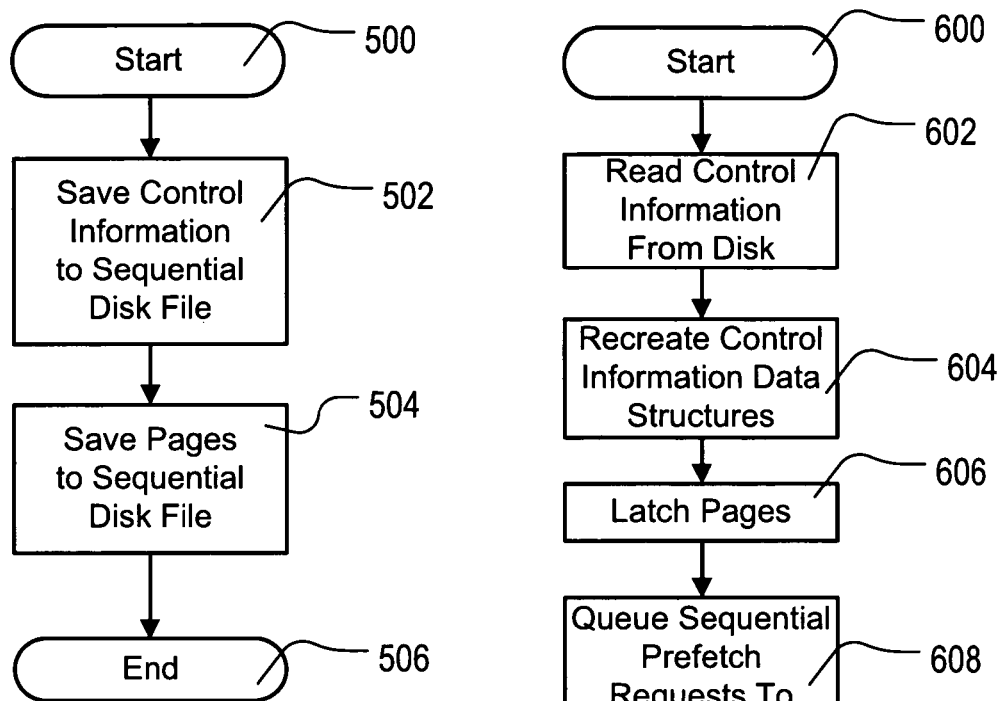
FIG. 5 is a process flowchart illustrating a method of the warm shutdown and restart function of FIG. 3 in performing a warm shutdown of the buffer pool illustrated in FIG. 3.

FIG. 5 is a flowchart illustrating the main operational steps involved in a warm shutdown of the buffer pool 316 in an exemplary embodiment. On receipt of a warm shutdown request from DBMS 306 (start step 500), warm shutdown and restart function 308 saves information stored in the buffer pool 316 as a sequential disk file. The sequential disk file is saved to a user declared temporary disk or shutdown space. It is common that such temporary space already exists in DBMS 306 for temporary objects such as temporary tables and thus no additional disk space is necessary. The size of temporary disk space has to be sufficient to accommodate the memory pages 402 stored in the buffer pool 316 and the control structures 404. At step 502, the control structures 404 comprising control information are saved to the sequential disk file on disk.

The memory pages 402 stored in the buffer pool 316 are saved to the sequential disk file on disk (step 504). Warm shutdown and restart function 308, to minimize the duration of the warm shutdown, may use a number of the writer threads 312 that are adapted to perform write operations simultaneously. Each of the writer threads 312 writes a respectively assigned block (414a, 414b, 414k) of memory of the buffer pool 316 to the contiguous disk file simultaneously. On completion of writing information from the buffer pool 316 (end step 506), the DBMS 306 or the computer system 100 may also be shutdown in accordance with operations that will be understood to persons skilled in the art.

Figure 6:
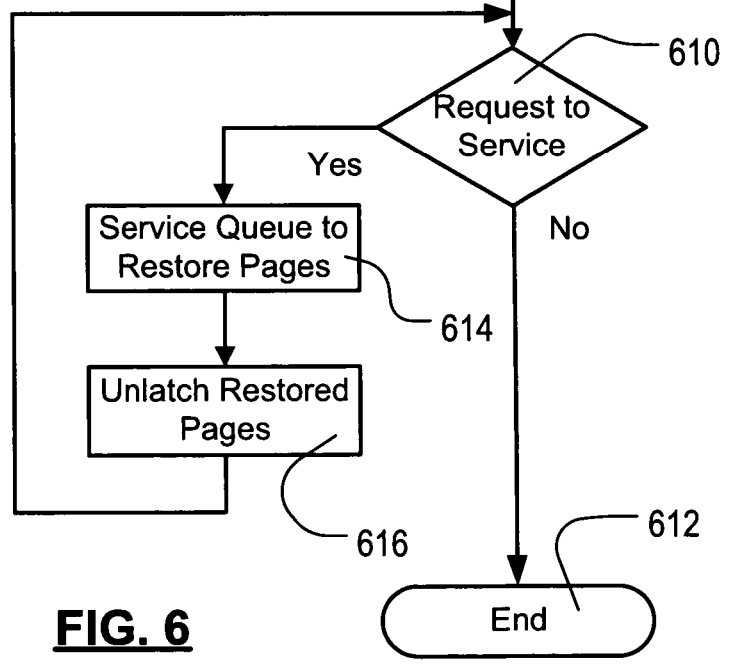
FIG. 6 is a process flowchart illustrating a method of the warm shutdown and restart function of FIG. 3 in restarting the buffer pool.

FIG. 6 is a flowchart illustrating the basic operational steps involved in a restart of the buffer pool 316 in accordance with an embodiment. After restarting DBMS 306, the warm shutdown and restart function 308 may be invoked to restart the buffer pool 316 in volatile memory 212. DBMS 306 determines whether to restart the buffer pool 316 as an empty buffer or use the warm shutdown and restart function 308 to restore information that was saved during the warm shutdown stage. On receipt of a restart signal from DBMS 306 (step 600), the warm shutdown and restart function 308 reads control structure information from the contiguous disk file stored on disk (not shown)(step 602) and recreates the control structures 404 in the buffer pool 316 (step 604). To recreate the control structures 404, page descriptors are recreated in PDD 406. Then, using the information contained in the page descriptors, other control structures 404 are recreated which are required to support DBMS 306 operations. The control structures comprise hash tables for quick lookup, linked lists to chain dirty pages, etc..

After re-creation of the control structures 404, the latch constructs of the descriptors stored in PPD 406 are invoked to latch (e.g. Xlatch) the memory pages 402 (step 606) to protect read access to those pages. This enables immediate reference to the memory pages 402 before the content of these memory pages 402 is restored to the buffer pool 316. After latching the memory pages 402, the buffer pool 316 is operable. As is described above, the memory pages 402 of the buffer pool 316 have been logically divided into blocks and each of these blocks was saved to the contiguous disk file (step 504, FIG. 5). To restore memory pages 402 to the buffer pool 316, each respective block (414a, 414b and 414k) is restored by the reader threads 314. Block read requests are put in queues for service by the reader threads 314 which operate asynchronously with respect to each other. These block read requests provide sequential prefetch to the reader threads 314 (step 610).

On receipt of a block read request from the queue (step 610), one of the reader threads 314 services the request by reading the block of pages from the sequential disk files and restoring same into the buffer pool 316 (step 614). Information from the temporary disk store is read on a block-by-block basis. The I/O is sequential and is performed in block sizes to optimize restoring operations. As each block is restored to the buffer pool 316, the restored pages for that block are unlatched (step 616). One of the large costs, in terms of time, to start a buffer pool is the allocation of the buffer pool memory (volatile). In an alternative embodiment, the buffer pool 316 may be made available following the allocation and readying of the PDs, which represent a small fraction of the size of the buffer pool 316, without allocating the memory pages 402 of the buffer pool 316. before each of the reader threads 314 reads an assigned block from the shutdown space, the reader threads may perform further allocation of the volatile memory 212 necessary for the blocks to be restored.

The actual buffer pool page that a PD represents need not be present when the buffer pool 316 is opened up since the latch on the PD is held. One of the reader threads 314 will only release the latch on the PD after first allocating the memory and then reading in the block facilitating a speedier database start up. The deferral of the allocation of the page-storing portion of the buffer pool 316 may be performed when undertaking a cold start of the buffer pool 316 as well. Persons of ordinary skill in the art will appreciate that reader threads 314 or other prefetchers receiving instructions to fetch pages from a database store or the shutdown space may allocate pages of the buffer pool 316 in response to the demand to read pages for storing to the buffer pool 316.

Since the buffer pool 316 is open for use before the pages are actually restored, it is possible that a client may request a page that has yet to be read and restored. The restore control 315 permits reference to memory pages 402 of the buffer pool 316 while restoring the memory pages 402. In this case, the client will have to wait on the page latch since all pages are latched in advance (step 606). When the page has been restored into the buffer pool 316 by the reader threads 314, the page is unlatched and the client will be granted access to use the page.

In another embodiment of the invention, warm shutdown and restart function 308 employing the restore control 315 may prioritize the restoring of a particular page in response to a client reference to the particular page. More particularly, the process of restoring pages may be organized in such a way that when a page is first requested that is not yet restored to the buffer pool 316, the reading of the page may be advanced out of the order determined by the queued read requests. The page may be read either by the requestor or by reordering the requests to the reader threads 314. In a further alternative, information indicating the relative likelihood that particular page will be required before other pages may be maintained, for example in the PDs. This relative weight indicating hot pages may be used to order the read requests in the queue. For block read requests, an average or other block-wide rating may be computed from the ratings for individual pages. The restart subsystem could then queue up the pre-fetch read requests in a more intelligent fashion thereby predicting which pages are likely to be accessed first by clients.

The warm shutdown and restore of the buffer pool in accordance with the present invention serves to reduce shutdown and restart durations. I/O efficiency is optimized when saving and restoring the buffer pool's contents including pages and control information associated with the pages. The restart of a pre-populated buffer pool may enhance query processing upon restart.

It is to be understood that the specific embodiments of the invention that have been described are merely illustrative of certain applications of the principle of the present invention. Numerous modifications may be made to the embodiments described herein without departing from the spirit and scope of the present invention.

What is claimed is:

1. A method for warmly shutting down and restoring a buffer pool having memory pages and control information associated with an information retrieval system, comprising:
   shutting down the buffer pool warmly by utilizing a plurality of writer threads adapted to perform write operations simultaneously, wherein each of the plurality of writer threads writes an assigned block of the memory pages to a persistent memory associated with the information retrieval system;
   in response to receiving a request to restore the buffer pool, restoring the buffer pool asynchronously to a buffer pool location by a plurality of reader threads in accordance with a restoration order of the control information, wherein the restoration order prioritizes restoration of a particular page based upon at least one client reference to the particular page, includes weight information indicating a relative likelihood that a particular page will be required before at least another page to order a plurality of read requests in a queue, and computes an average rating for at least one block read request based upon ratings for individual particular pages, further wherein each of the pages are latched until restoration is complete; and
   in response to receiving a request to access a latched page, advancing a restoring of the latched page out of the restoration order to provide an advanced out of order page, and accessing the advanced out of order page while the advanced out of order page is in the buffer pool location prior to completion of the restoring of the buffer pool.

2. The method of claim 1, wherein the pages are logically divided into a plurality of blocks of pages, further wherein the pages are stored to the persistent memory on a block basis.

3. The method of claim 2, further comprising:
   optimizing input/output operations by selecting a size of each block of pages.

4. The method of claim 2, wherein the pages are stored to the persistent memory on a block basis comprises:
   storing two or more blocks of pages to the persistent memory in parallel.

5. The method of claim 2, wherein the persistent memory is a hard disk drive.

6. The method of claim 1, further comprising:
   reading the pages into a volatile memory on a block basis to restore the pages to the buffer pool on a block basis.

7. The method of claim 1, further comprising:
   reading two or more blocks of the pages stored in volatile memory in parallel.

8. The method of claim 1, further comprising:
   unlatching one or more of the pages when the one or more of the pages are restored to the buffer pool.

9. The method of claim 1, further comprising:
   prioritizing a restoring of a particular page of the pages in response to a client reference to the particular page.

10. A system for restoring a buffer pool having pages and control information stored in a persistent memory associated with an information retrieval system after a warm shutdown, the system comprising a processor and a memory device coupled to the processor, wherein the memory device stores an application which, when executed by the processor, causes the processor to:
    shutting down the buffer pool warmly by utilizing a plurality of writer threads adapted to perform write operations simultaneously, wherein each of the plurality of writer threads writes an assigned block of the memory pages to a persistent memory associated with the information retrieval system;
    in response to receiving a request to restore the buffer pool, restoring the buffer pool asynchronously to a buffer pool location by a plurality of reader threads in accordance with a restoration order of the control information, wherein the restoration order prioritizes restoration of a particular page based upon at least one client reference to the particular page, includes weight information indicating a relative likelihood that a particular page will be required before at least another page to order a plurality of read requests in a queue, and computes an average rating for at least one block read request based upon ratings for individual particular pages, further wherein each of the pages are latched until restoration is complete; and
    in response to receiving a request to access a latched page, advance a restoring of the latched page out of the restoration order to provide an advanced out of order page, and access the advanced out of order page while the advanced out of order page is in the buffer pool location prior to completion of the restoring of the buffer pool.

11. The system of claim 10, wherein the pages are logically divided into a plurality of blocks of pages, further wherein the pages are stored to the persistent memory on a block basis.

12. The system of claim 11, wherein the application, when executed by the processor, further causes the processor to:
    optimize input/output operations by selecting a size of each block of pages.

13. The system of claim 11, wherein the pages are stored to the persistent memory on a block basis comprises:

storing two or more blocks of pages to the persistent memory in parallel.

14. The system of claim 11, wherein the persistent memory is a hard disk drive.

15. The system of claim 10, wherein the application, when executed by the processor, further causes the processor to:
read the pages into a volatile memory on a block basis to restore the pages to the buffer pool on a block basis.

16. The system of claim 10, wherein the application, when executed by the processor, further causes the processor to:
read two or more blocks of the pages stored in volatile memory in parallel.

17. The system of claim 10, wherein the application, when executed by the processor, further causes the processor to:
unlatch one or more of the pages when the one or more of the pages are restored to the buffer pool.

18. The system of claim 10, wherein the application, when executed by the processor, further causes the processor to:
prioritize a restoring of a particular page of the pages in response to a client reference to the particular page.

* * * * *